(12) United States Patent
Kusakabe et al.

(10) Patent No.: US 9,438,764 B2
(45) Date of Patent: Sep. 6, 2016

(54) INFORMATION PROCESSING APPARATUS WHICH EXTRACTS A CHARACTER STRING FROM A FILE NAME AND COLLATES IT WITH ADDRESS BOOK INFORMATION

(71) Applicant: CANON KABUSHIKI KAISHA, Tokyo (JP)

(72) Inventors: Yuki Kusakabe, Kawasaki (JP); Ryuta Mori, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/740,090

(22) Filed: Jun. 15, 2015

(65) Prior Publication Data
US 2015/0373224 A1 Dec. 24, 2015

(30) Foreign Application Priority Data
Jun. 19, 2014 (JP) ................ 2014-126676

(51) Int. Cl.
| | |
|---|---|
| *H04N 1/32* | (2006.01) |
| *H04N 1/00* | (2006.01) |
| *H04N 1/327* | (2006.01) |

(52) U.S. Cl.
CPC ...... *H04N 1/32096* (2013.01); *H04N 1/00244* (2013.01); *H04N 1/00413* (2013.01); *H04N 1/32765* (2013.01); *H04N 2201/0093* (2013.01)

(58) Field of Classification Search
CPC .............. H04N 1/32096; H04N 1/00244; H04N 1/32765; H04N 2201/0093
USPC ................. 358/1.15, 405, 407, 440; 382/317
See application file for complete search history.

(56) References Cited

U.S. PATENT DOCUMENTS

| | | | | |
|---|---|---|---|---|
| 6,980,331 | B1 * | 12/2005 | Mooney ............. | H04N 1/00358 358/3.28 |
| 2005/0195446 | A1 * | 9/2005 | Kasatani ............ | H04N 1/00222 358/402 |
| 2007/0089173 | A1 * | 4/2007 | Hikichi ................ | G06F 21/604 726/26 |
| 2013/0287189 | A1 * | 10/2013 | Cichielo ............ | H04N 1/00281 379/100.17 |

FOREIGN PATENT DOCUMENTS

| | | |
|---|---|---|
| JP | 2008-113079 A | 5/2008 |
| JP | 2011-254235 A | 12/2011 |

* cited by examiner

*Primary Examiner* — Jamares Q Washington
(74) *Attorney, Agent, or Firm* — Canon USA, Inc. I.P. Division

(57) ABSTRACT

An information processing apparatus according to an exemplary embodiment of the present invention acquires a file from a file generation apparatus and also acquires address book information including a facsimile number from an apparatus having a facsimile function. Then, the information processing apparatus extracts a character string from a predetermined position in a file name of the acquired file and collates the extracted character string with the acquired address book information to identify a facsimile number of a transmission destination of the acquired file.

10 Claims, 15 Drawing Sheets

FIG. 8A
FILE NAME FORMAT (810)

811  812  813  814  815  816  817  818

201204_PROVISION FORM_COMPANY B_HOME NURSING CARE (5646544646)_NURSING CARE A(2345678901)_20140131.pdf

FIG. 8B
FILE NAME NAMING RULE (820)

821                      822           823

*_*_*_*   (*)_* (target)_*.pdf、1

*_ target_*_*_*_*.pdf、0

FIG. 8C
ADDRESS BOOK INFORMATION (830)

| 831 | 832 | 833 | 834 |
|---|---|---|---|
| DESTINATION ID | NAME | FURIGANA | FAX NUMBER |
| 0001 | NURSING CARE A | NURSING CARE A_2345678901 | 0311112222 |
| 0002 | NURSING CARE C | NURSING CARE C_2958476523 | 0333334444 |
| ... | ... | ... | ... |

FIG. 8D
FILE NAME REGULAR EXPRESSION (840)

841  842  843  844  845  846  847  848

^(?(date)[^_]+)_(?(formtype)[^_]+)_(?(srcname)[^_]+)_(?(srctype)[^_]+)\((?(srcID)[^\)]+)\)_(?(dstname)[^_]+)\((?(dstID)[^\)]+)\)_(?(datetime)[^.]+)

FIG. 9A

FILE DOWNLOAD SCREEN (910)

OUTPUT

| PREVIEW | PRINT | FILE OUTPUT |
|---------|-------|-------------|
| 911 | 912 | 913 |

| FACILITY ID (914) | SERVICE PROVIDER FACILITY (915) | SELECT (916) |
|-------------------|-------------------------------|--------------|
| 2345678901 | NURSING CARE A | ✓ 917 |
| 2458958672 | NURSING CARE C | |
| ...... | ...... | |

918 — CLOSE

FIG. 9B

STORAGE DESTINATION SPECIFICATION SCREEN (920)

REFERENCE TO FOLDER

SELECT FILE OUTPUT DESTINATION

— C: ~921

922 OK  923 CANCEL

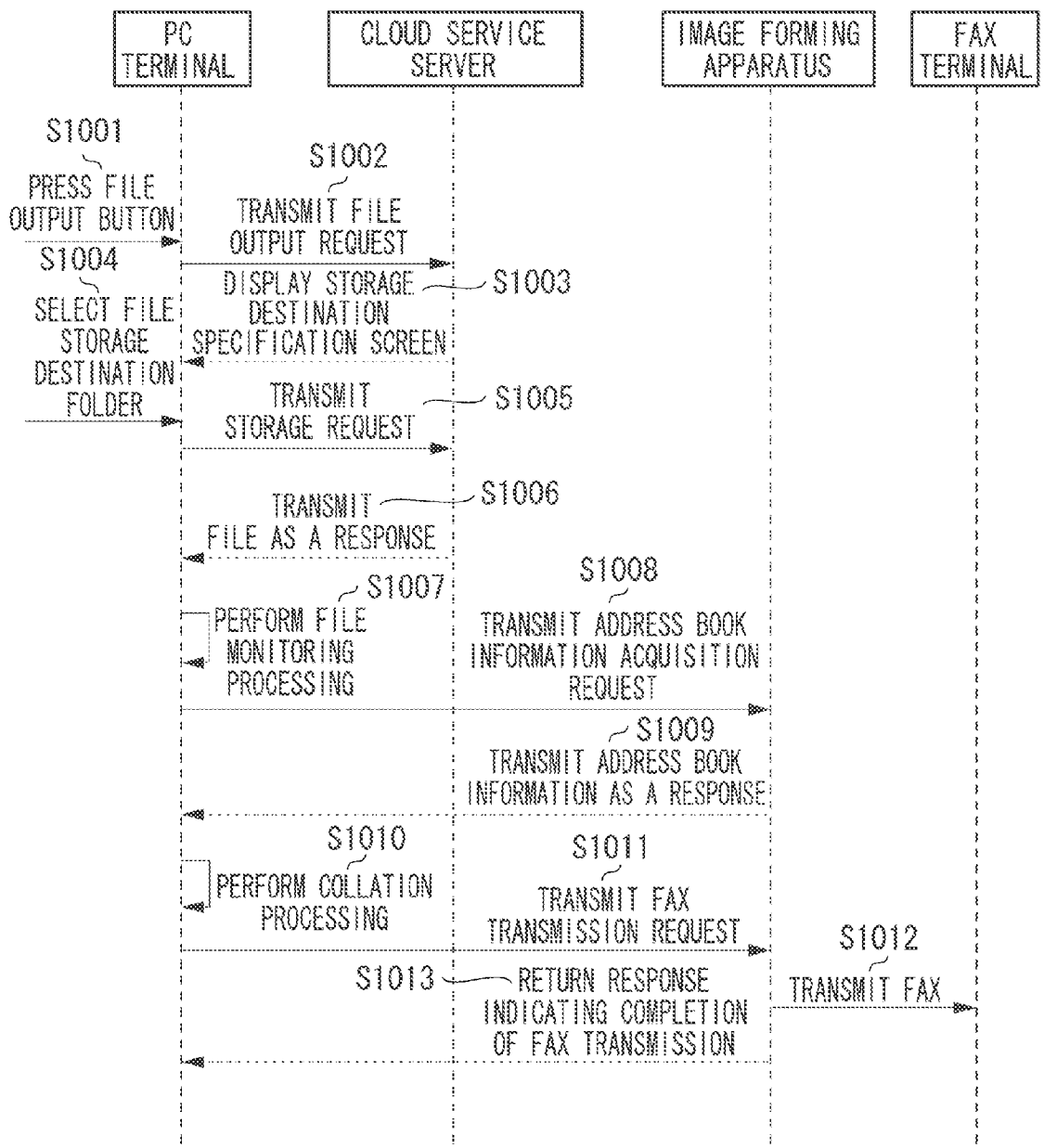

FIG. 15 FAX TRANSMISSION DIALOG (1500)

FAX TRANSMISSION DIALOG

ADDRESS LIST:

SEARCH KEYWORD: [____] [SEARCH] [CLEAR]

| NAME | FURIGANA | FAX NUMBER | COMPANY NAME | DIVISION NAME |
|---|---|---|---|---|
| NURSING CARE A | _2345678901 | 0311112222 | | |
| NURSING CARE C | _2958476523 | 0333334444 | | |

1502

[ADD] ~1503

[ADD NEW ADDRESS] 1505
[EDIT] 1506
[DELETE] 1507
[COVER SHEET] 1508

DESTINATION ADDRESS:

| NAME | FURIGANA | FAX NUMBER | COMPANY NAME | DIVISION NAME |
|---|---|---|---|---|
| | | | | |

1504

[OK] 1509    [CANCEL] 1510

1501

INFORMATION PROCESSING APPARATUS WHICH EXTRACTS A CHARACTER STRING FROM A FILE NAME AND COLLATES IT WITH ADDRESS BOOK INFORMATION

BACKGROUND OF THE INVENTION

1. Field of the Invention

The present invention relates to a technique for identifying a destination of a data file to be transmitted by facsimile (fax).

2. Description of the Related Art

Conventional methods for specifying a destination of a fax transmission include a method in which a user inputs a fax number of a destination by using dial keys of a fax machine, and a method in which a user selects a desired destination from destination information registered in an address book of a fax machine.

Further, Japanese Patent Application Laid-Open No. 2011-254235 discusses a technique for setting a destination by using a property of data to be transmitted by fax and then sending the data by fax. More specifically, the data to be transmitted by fax is selected, and a value of a property item provided to the selected data is acquired. Then, whether the acquired value is a fax number is determined, and if the acquired value is determined to be a fax number, the acquired value is set as the fax number of the destination.

Further, Japanese Patent Application Laid-Open No. 2008-113079 discusses the following technique. When scanned image data is to be transmitted with a file name, a character string input as the file name by a user is collated with a registered character string stored in advance. Then, if at least a part of the input character string matches the registered character string, a destination corresponding to the registered character string is set as a default destination. More specifically, according to the technique discussed in Japanese Patent Application Laid-Open No. 2008-113079, the destination corresponding to the registered character string that matches the character string input by the user is selected from destinations registered in a multifunctional peripheral.

In the case of Japanese Patent Application Laid-Open No. 2011-254235, a fax number needs to be directly set for a property of data to be transmitted.

Further, in the case of Japanese Patent Application Laid-Open No. 2008-113079, since the character string input by the user is used in the collation processing, if the user inputs a wrong character string, a wrong destination may be selected.

SUMMARY OF THE INVENTION

According to an aspect of the present invention, an information processing apparatus includes a first acquisition unit configured to acquire a file from a file generation apparatus, a second acquisition unit configured to acquire address book information including a facsimile number from an apparatus having a facsimile function, an extraction unit configured to extract a character string from a predetermined position in a file name of the file acquired by the first acquisition unit, and a collation unit configured to collate the character string extracted by the extraction unit with the address book information acquired by the second acquisition unit to identify a facsimile number of a transmission destination of the acquired file.

Further features of the present invention will become apparent from the following description of exemplary embodiments with reference to the attached drawings.

BRIEF DESCRIPTION OF THE DRAWINGS

FIGS. 8A, 8B, 8C, and 8D illustrate an example of a file name format, an example of a file name naming rule according to a second exemplary embodiment, an example of address book information, and an example of a file name naming rule using a regular expression, respectively.

FIGS. 9A and 9B illustrate an example of an operation screen for downloading a file and an example of an operation screen for specifying a storage destination, respectively.

FIG. 10 illustrates an entire processing sequence according to an exemplary embodiment of the present invention.

FIG. 15 illustrates an example of a fax transmission dialog.

DESCRIPTION OF THE EMBODIMENTS

Figure 1:
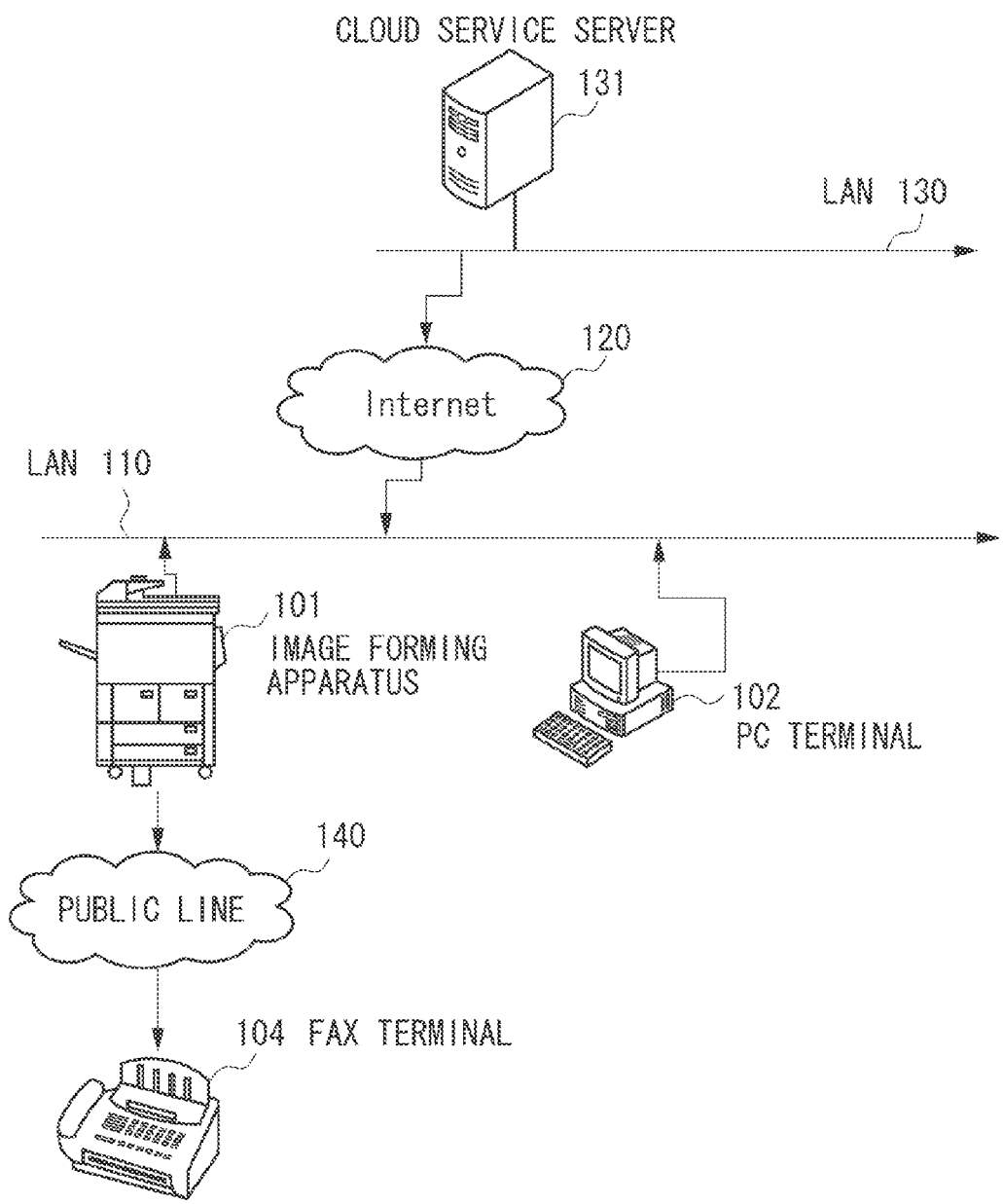
FIG. 1 illustrates an example of a configuration of a system to which an exemplary embodiment of the present invention is applicable.

FIG. 1 illustrates an example of a configuration of a system to which a first exemplary embodiment of the present invention is applicable. As illustrated in FIG. 1, an image forming apparatus 101 and a personal computer (PC) terminal 102 are connected to a local area network (LAN) 110 such as Ethernet (registered trademark), a wireless LAN, etc. A cloud service server 131 is connected to a LAN 130 such as Ethernet (registered trademark), a wireless LAN, etc. A fax terminal 104 is connected to a public line (telephone line) 140. Further, the LANs 110 and 130 are connected to the Internet 120. In this way, the apparatuses connected to the LAN 110 or the LAN 130 can communicate with one another.

The image forming apparatus 101 is a multifunctional peripheral including an operation unit, a scanner unit, a printer unit, and a fax unit. In the system according to the present exemplary embodiment, the image forming apparatus 101 is used to transmit a fax document and is also used as acquisition destination of address book information. The image forming apparatus 101 is not limited to a multifunctional peripheral and may be a facsimile apparatus having a facsimile function and an address book function.

The PC terminal (information processing apparatus) 102 is connected to the cloud service server 131 to acquire data (file) to be transmitted by fax, acquires address book information 830 (see FIG. 8C) from the image processing apparatus 101, sets a destination for the data to be transmitted by fax, and transmits the data by fax via the image forming apparatus 101. When accessing the cloud service server 131, the PC terminal 102 uses a web browser (not illustrated) operating on the PC terminal 102.

The fax terminal 104 is an apparatus configured to receive a fax document transmitted from the image forming apparatus 101 via the public line 140.

The cloud service server 131 generates a file of a document to be transmitted as a fax document and outputs the generated document file to the PC terminal 102. While the present exemplary embodiment describes the cloud service server 131 as a virtual server using cloud computing, the cloud service server 131 is not limited thereto. Alternatively, the cloud service server 131 may be a single physical server. The cloud service server 131 may be any type of file generation apparatus as long as it can generate a file of a fax document and give a file name according to a predetermined rule.

Figure 2:
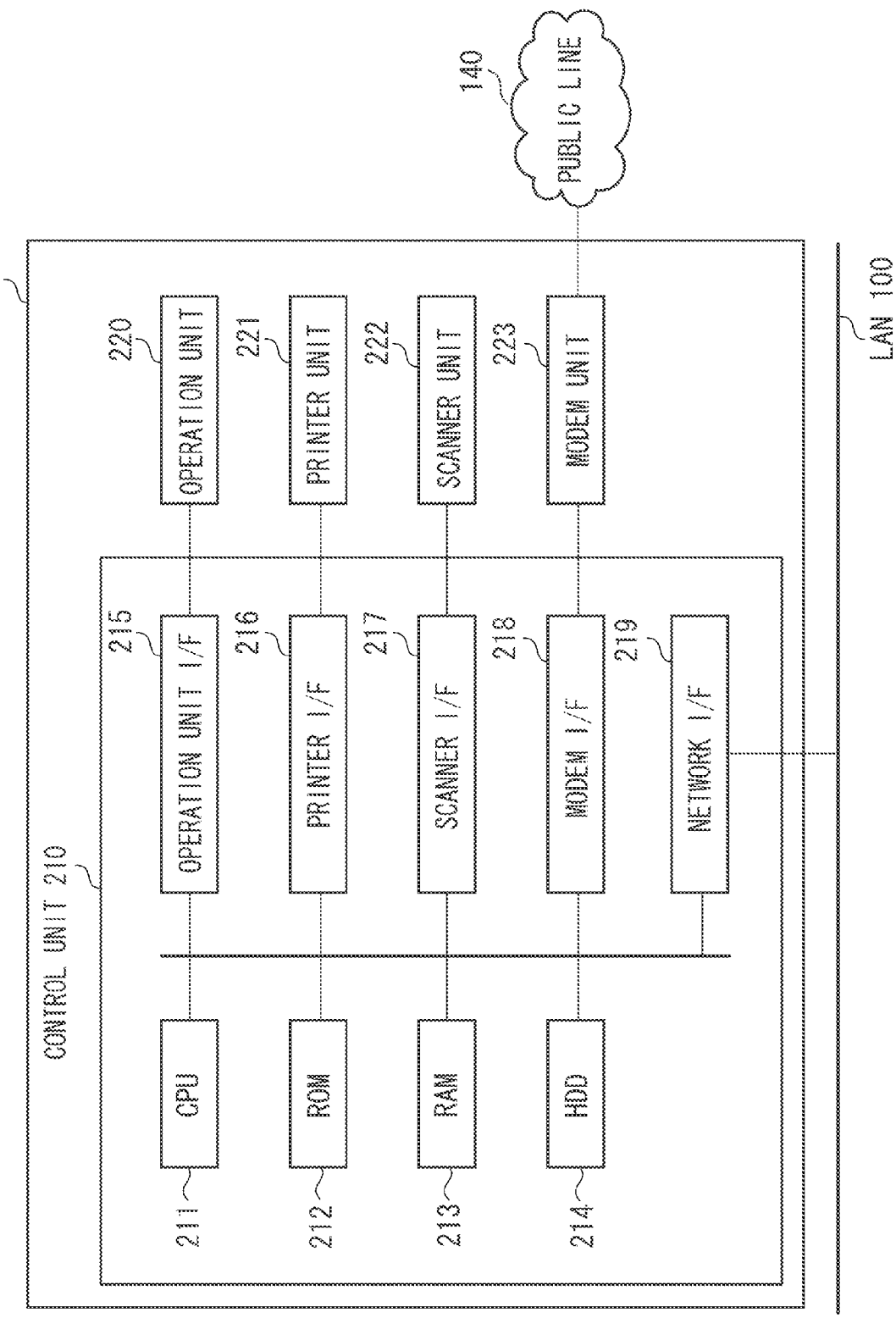
FIG. 2 is a block diagram illustrating an example of a configuration of an image forming apparatus.

FIG. 2 is a block diagram illustrating an example of a hardware configuration of the image forming apparatus 101. A control unit 210 including a central processing unit (CPU) 211 controls the entire operations of the image forming apparatus 101. The CPU 211 reads and executes a control program stored in a storage medium such as a read only memory (ROM) 212 or a hard disk drive (HDD) 214 to perform various types of control such as scanner reading control, data transmission control, etc. A random access memory (RAM) 213 is a main memory of the CPU 211 and used as a temporary storage area such as a work area. The HDD 214 is a storage medium for storing image data, various types of programs, or various types of information tables.

An operation unit I/F 215 is an interface for connecting an operation unit 220 to the control unit 210. The operation unit 220 includes a liquid crystal display unit having a touch panel function and a keyboard.

A printer I/F 216 is an interface for connecting a printer unit 221 to the control unit 210. Image data to be printed by the printer unit 221 is transferred from the control unit 210 via the printer I/F 216 and printed on a recording medium by the printer unit 221.

A scanner I/F 217 is an interface for connecting a scanner unit 222 to the control unit 210. The scanner unit 222 reads an image on a document to generate image data and inputs the generated image data into the control unit 210 via the scanner I/F 217.

A modem I/F 218 is an interface for connecting a modem unit 223 to the control unit 210. The modem unit 223 connects the control unit 210 (image forming apparatus 101) to the public line 140. The modem unit 223 transmits and receives a fax to and from an external facsimile apparatus by using the public line 140.

A network I/F 219 is an interface for connecting the control unit 210 (image forming apparatus 101) to a network such as the LAN 110. The network I/F 219 transmits image data or information to an external apparatus (e.g., the cloud service server 131) on a network and receives various types of information from an external apparatus.

Figure 3:
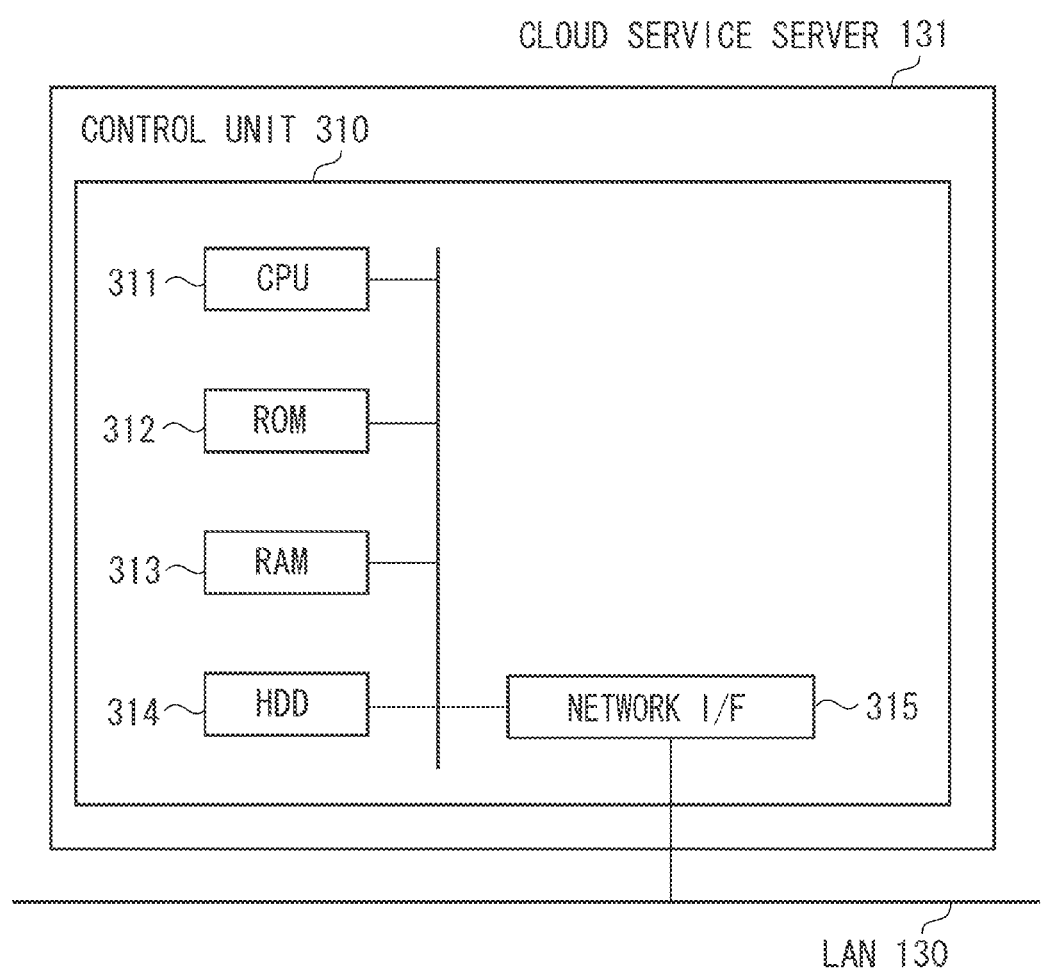
FIG. 3 is a block diagram illustrating an example of a configuration of a cloud service server.

FIG. 3 is a block diagram illustrating an example of a hardware configuration of the cloud service server 131. A control unit 310 including a CPU 311 controls the entire operations of the cloud service server 131. The CPU 311 reads and executes a control program stored in a storage medium such as a ROM 312 or a HDD 314 to execute various types of control processing. A RAM 313 is a main memory of the CPU 311 and used as a temporary storage area such as a work area. The HDD 314 is a storage medium for storing image data, various types of programs, or various types of information tables. A network I/F 315 is an interface for connecting the control unit 310 (cloud service server 131) to a network such as the LAN 130. The network I/F 315 transmits and receives various types of information to and from other apparatuses on the network.

Figure 4:
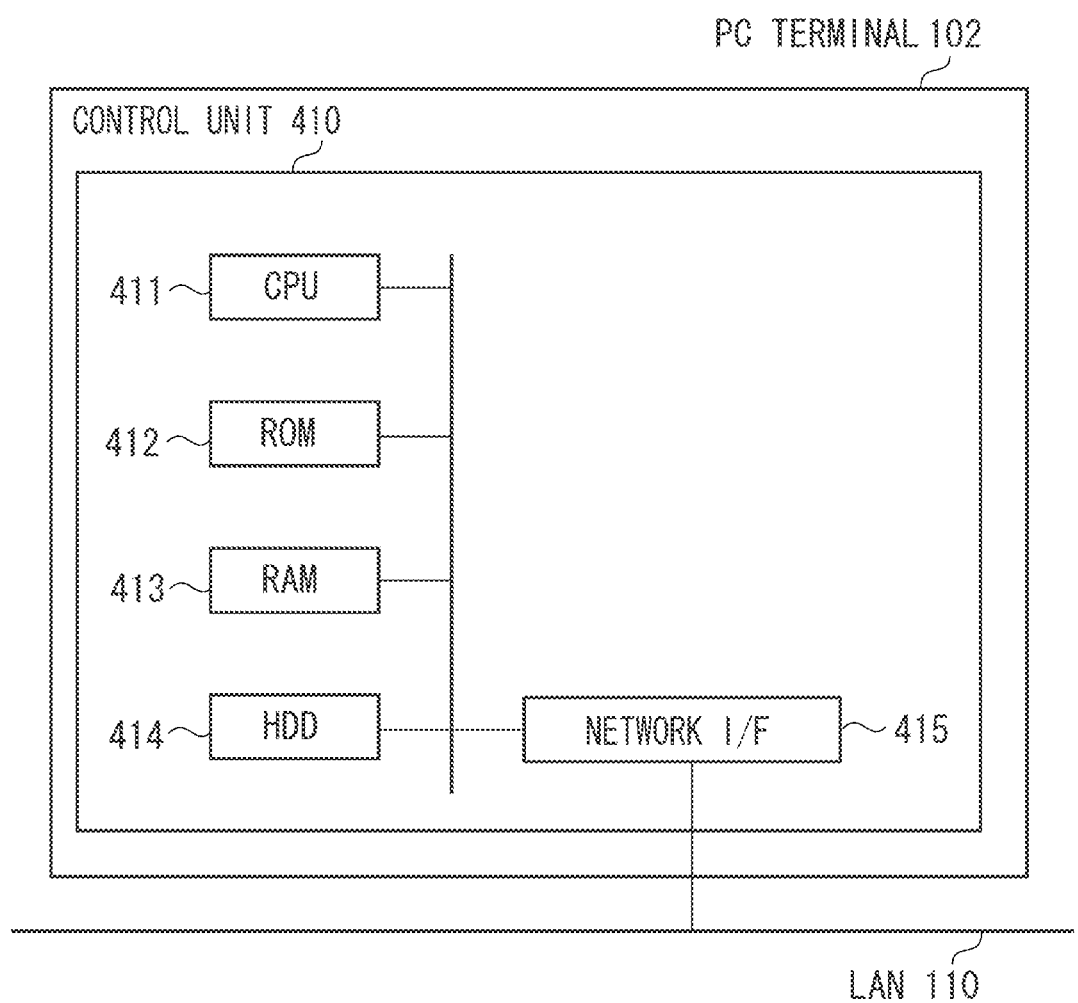
FIG. 4 is a block diagram illustrating an example of a configuration of a personal computer (PC) terminal.

FIG. 4 is a block diagram illustrating an example of a hardware configuration of the PC terminal 102. A control unit 410 including a CPU 411 controls the entire operations of the PC terminal 102. The CPU 411 reads and executes a control program stored in a storage medium such as a ROM 412 or a HDD 414 to execute various types of control processing. A RAM 413 is a main memory of the CPU 411 and used as a temporary storage area such as a work area. The HDD 414 is a storage medium for storing image data, various types of programs, or various types of information tables. A network I/F 415 is an interface for connecting the control unit 410 (PC terminal 102) to a network such as the LAN 110. The network I/F 415 transmits and receives various types of information to and from other apparatuses on the network. Further, the PC terminal 102 includes an operation unit (not illustrated) such as a display and a keyboard, and the control unit 310 controls the operation unit via an operation unit I/F.

Figure 5:
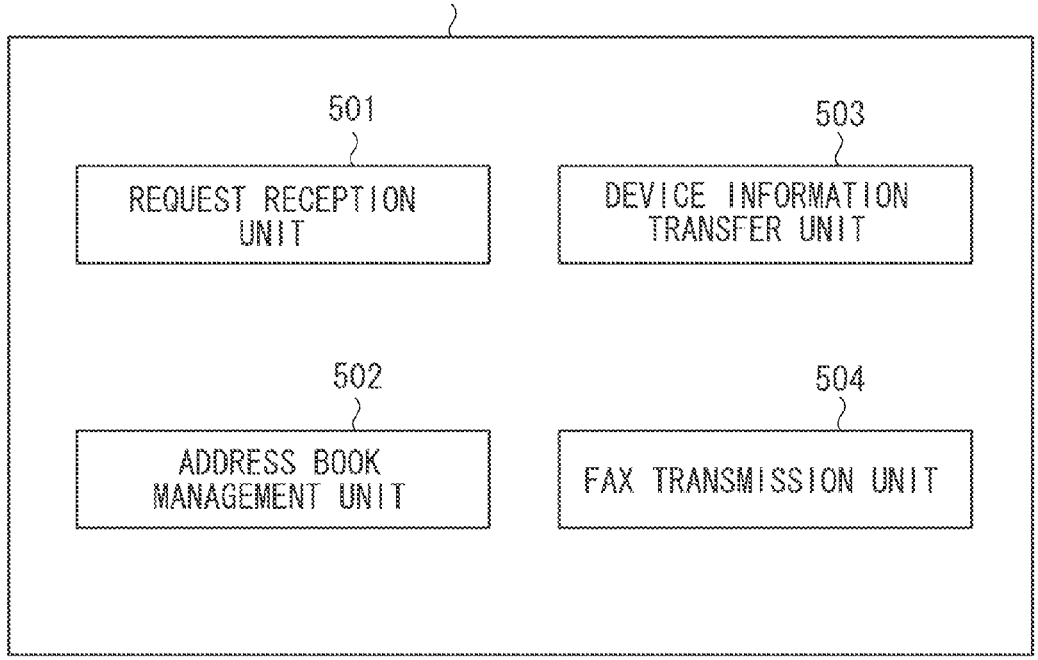
FIG. 5 illustrates an example of a software configuration of the image forming apparatus.

FIG. 5 illustrates a configuration example of software modules that are related to fax transmission processing and address book information acquisition and are stored in the HDD 214 of the image forming apparatus 101. The CPU 211 of the image forming apparatus 101 reads and executes the software modules to function as the respective processing units.

A request reception unit 501 is a software module for receiving a fax transmission request and an address book information acquisition request from the PC terminal 102 via the network I/F 219. In the case of receiving a fax transmission request, the request reception unit 501 transmits the fax transmission request to a fax transmission unit 504. Further, in the case of receiving an address book information acquisition request, the request reception unit 501 transmits the address book information acquisition request to a device information transfer unit 503.

An address book management unit 502 is a software module for managing the address book information 830 (see FIG. 8C) existing in the HDD 214. The address book management unit 502 provides the address book information 830 in response to a request from the device information transfer unit 503.

The device information transfer unit 503 is a software module for acquiring the address book information 830 from the address book management unit 502 and returning a response to the PC terminal 102 when an address book information acquisition request made by the PC terminal 102 is received from the request reception unit 501.

The fax transmission unit 504 is a software module for performing fax transmission using fax document data received together with a fax transmission request when the fax transmission request made by the PC terminal 102 is received from the request reception unit 501.

Figure 6:
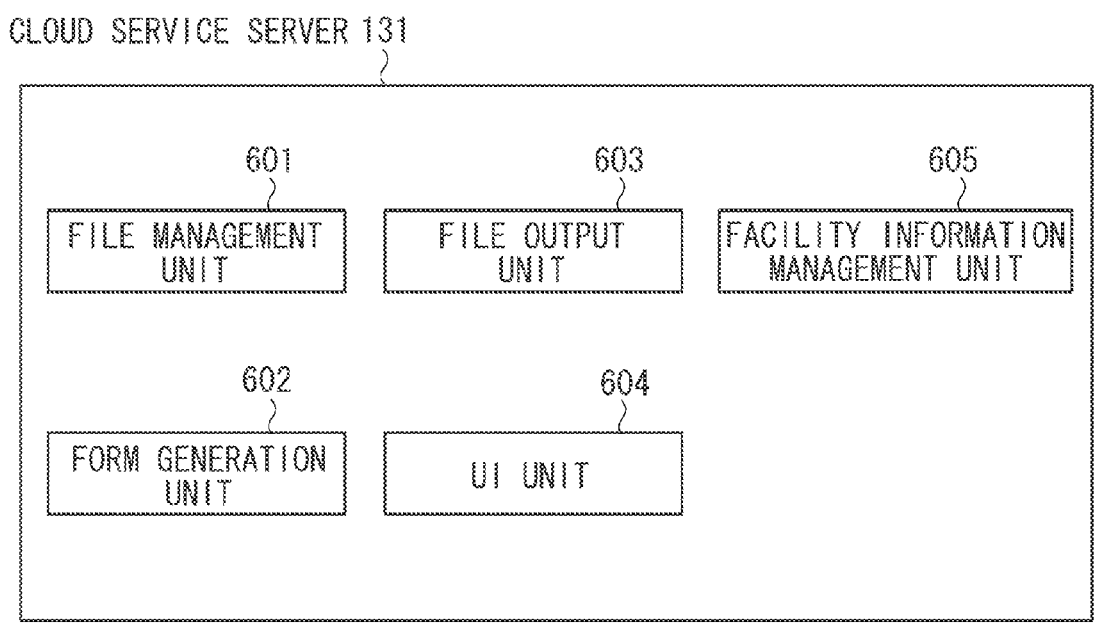
FIG. 6 illustrates an example of a software configuration of the cloud service server.

FIG. 6 illustrates a configuration example of software modules stored in the HDD 314 of the cloud service server 131. The CPU 311 of the cloud service server 131 reads and executes the software modules to function as the respective processing units.

A file management unit 601 is a software module for managing form data (document data to be transmitted by fax) that is generated by a form generation unit 602 of the cloud service server 131. The file management unit 601 stores various types of generated form data. The form data is also used as data for fax transmission.

The form generation unit 602 is a software module for generating form data from various types of data stored in the cloud service server 131. The generated form data is managed by the file management unit 601.

A file output unit 603 is a software module for executing download processing (output processing) of form data (document data to be transmitted by fax) in response to a storage request in step S1005, which will be described below.

A user interface (UI) unit 604 is a software module for displaying a file download screen 910 (see FIG. 9A) for form data or a storage destination specification screen 920 (see FIG. 9B) on the PC terminal 102.

A facility information management unit 605 is a software module for managing a facility identifier (ID). The facility ID is used to generate a file name to be given to a file of form data (document data to be transmitted by fax) that is output from the file output unit 603. The facility ID is a unique value including a 10-digit numerical value and is managed while being associated with the name of a facility that is a fax transmission destination. While the present exemplary embodiment describes the unique value (unique key) as "facility ID", a unique key of any form can be used.

Figure 7:
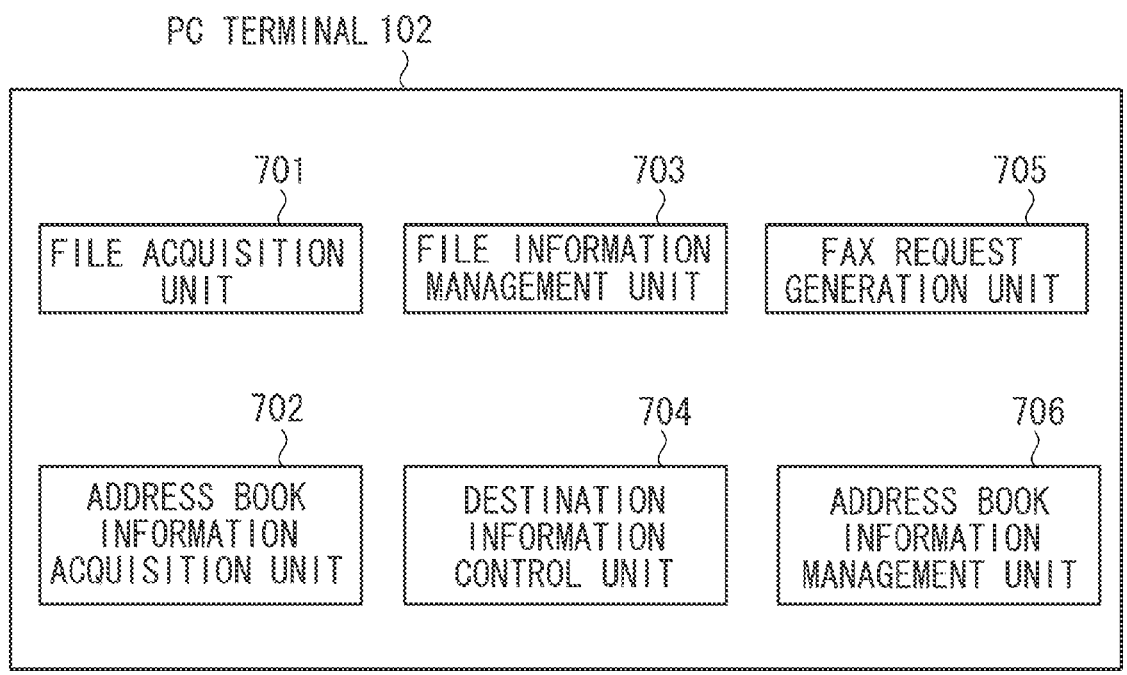
FIG. 7 illustrates an example of a software configuration of the PC terminal.

FIG. 7 illustrates a configuration example of software modules stored in the HDD 414 of the PC terminal 102. The CPU 411 of the PC terminal 102 reads and executes the software modules to function as the respective processing units.

A file acquisition unit 701 is a software module for monitoring a local folder on the PC terminal 102 and, in response to detecting storage of a file of form data transmitted from the cloud service server 131, acquiring the stored file. While the present exemplary embodiment describes that a file is acquired by performing file monitoring, any other method may be used to acquire a file.

An address book information acquisition unit 702 is a software module for acquiring the address book information 830 (see FIG. 8C) from the image forming apparatus 102 and managing the address book information 830 in the HDD 414.

A file information management unit 703 is a software module for managing in the HDD 414 a file acquired by the file acquisition unit 701.

A destination information control unit 704 is a software module for performing collation processing 1100 (described below) using the address book information 830 and a file name of a file acquired by the file acquisition unit 701 to identify a destination of a fax.

A fax request generation unit 705 is a software module for generating a fax transmission request to be made to the image forming apparatus 101 in a case where a file with a file name including a name or "furigana" (Japanese ruby characters) of the address book information 830 is found as a result of the collation processing performed by the destination information control unit 704.

An address book information management unit 706 is a software module for managing in the HDD 414 the address book information 830 acquired by the address book information acquisition unit 702.

The following describes a file name format and an address book information format used in the first exemplary embodiment, with reference to FIGS. 8A and 8C. FIG. 8A illustrates a format example of a file name given to a file that is downloaded from the cloud service server 131 by the PC terminal 102. The file name format 810 used in the example illustrated in FIG. 8A is an example of a format of a file name given to a file used in a nursing care service industry. The following describes each item (each item separated with an underscore or parentheses) included in a character string of a file name. First, an item 811 "201204" indicates "year and month" specified in the data of the file (form). In this example, the item 811 indicates that the file describes information of a nursing care service provided in April 2012. An item 812 "provision form" is a character string indicating the type of form. An item 813 "company B" indicates the name of a facility that is a transmission source of the file. An item 814 "home nursing care" indicates the type of a transmission source facility. Further, an item 815 "5646544646" indicates the facility ID of a transmission source facility. The facility ID is a unique 10-digit numerical value. An item 816 "nursing care A" indicates the name of a facility that is a transmission destination. Further, an item 817 "2345678901" indicates the facility ID of a transmission destination facility. The facility ID of a transmission destination facility is also a unique 10-digit numerical value and is used as a key for identifying a transmission destination fax number in subsequent processing. Further, an item 818 "20140131" indicates the date, month, and year when the file was generated. The file name format 810 includes the foregoing information. The file name format is not limited to the items illustrated in FIG. 8A and may be any other format FIG. 8C illustrates an example of the address book information 830 managed in the HDD 214 of the image forming apparatus 101. The following describes each item included in the address book information 830. A destination ID 831 is an ID that uniquely indicates a destination registered in the address book 830. A name 832 indicates the name of a destination registered in the address book information 830. A furigana 833 is the furigana of the name of a destination registered in the address book information 830. In the present exemplary embodiment, in addition to the furigana of the name of a destination, the facility ID (the item 817) of the destination is registered in the furigana 833. A fax number 834 is a fax number of a destination registered in the address book information 830. A registration location of the facility ID (the item 817) is not limited to the furigana 833 and may be registered together with other information (e.g., the name 832) in the address book information 830.

The following describes a user interface (UI) displayed according to the present exemplary embodiment. FIG. 9A illustrates a web screen that is generated by the UI unit 604 and returned as a response in a case where the cloud service server 131 receives an output request from the PC terminal 102. The following describes each item included in the screen. A preview button 911 is pressed to preview a file (form). A print button 912 is pressed to print a file. A file output button 913 is pressed to download a file from the cloud service server 131 to an external system such as the PC terminal 102. In response to a press of the file output button 913, a web browser displays the storage destination specification screen 920 illustrated in FIG. 9B. A facility ID 914 and a service provider facility 915 indicate information about a facility that is a target of various types of operations (preview, print, file output). A select column 916 is a check column for specifying a facility as a target of various types of operations. For example, in a case where a box 917 of the first row is checked, a file to be transmitted to the facility "nursing care A" having the facility ID "2345678901" is specified as an operation target. A close button 918 is used to close the file download screen 910. The web browser closes the file download screen 910 in response to the close button 918 being pressed by the user.

FIG. 9B illustrates a web screen that is generated by the UI unit 604 and returned as a response in a case where the file output button 913 on the PC terminal 102 is pressed and the cloud service server 131 receives a file output request from the PC terminal 102. The following describes each item included in the screen. A folder hierarchy 921 indicates a hierarchy of storage destination folders. In this example, as the folder hierarchy 921, the C drive, which is a local drive, and subfolders under the C drive are displayed. A user of the PC terminal 102 selects a desired folder as an output destination from the displayed folder hierarchy. An OK button 922 is pressed to confirm the folder selected by the user as a file output destination. Pressing a cancel button 923 cancels the selection of a folder and returns the screen to the user file download screen 910.

FIG. 10 is a sequence diagram illustrating a flow of processing in which the PC terminal 102 acquires data to be transmitted by fax from the cloud service server 131 and transmits the data by fax to the fax terminal 104 via the image forming apparatus 101 according to the present exemplary embodiment.

First, the web browser on the PC terminal 102 transmits an output request to the cloud service server 131 and displays the file download screen 910 acquired as a response to the output request, and a desired facility is selected by a user (see the box 917 in FIG. 9A). In step S1001, the user presses the file output button 913 on the screen. Then, in step S1002, the web browser transmits to the cloud service server 131 a file output request relating to the selected facility. In step S1003, the cloud service server 131 transmits to the web browser as a response the storage destination specification screen 920 generated by the UI unit 604. The web browser displays the storage destination specification screen 920 acquired as a response. In step S1004, the user selects a file storage destination folder and presses the OK button 922 on the displayed storage destination specification screen 920. As a result, in step S1005, the web browser transmits a storage request to the cloud service server 131. Based on the output request received in step S1002 and the storage request received in step S1005, the cloud service server 131 transmits, to the file output unit 603, the form data generated by the form generation unit 602 and managed by the file management unit 601. The form generation unit 602 searches for the facility name selected on the file download screen 910 by the user, among the data managed by the facility information management unit 605, thereby acquiring the facility ID and the like corresponding to the selected facility name. Then, the form generation unit 602 generates a form data file with the file name generated using information such as the facility ID.

In step S1006, the file output unit 603 of the cloud service server 131 transmits the file generated by the form generation unit 602 to the web browser on the PC terminal 102 as a response. The web browser on the PC terminal 102 stores the acquired form data file in the folder selected as the storage destination by the user. In step S1007, the file acquisition unit 701 of the PC terminal 102 performs file monitoring processing and detects the file stored in the folder. Further, the file information management unit 703 manages information such as the file name of the file detected by the file acquisition unit 701.

After the file acquisition unit 701 detects the file, in step S1008, the address book information acquisition unit 702 transmits an address book information acquisition request to the image forming apparatus 101. When the image forming apparatus 101 receives the address book information acquisition request from the PC terminal 102, the device information transfer unit 503 acquires the address book information 830 from the address book management unit 502, and in step S1009, the image forming apparatus 101 transmits the acquired address book 830 to the PC terminal 102 as a response. In the PC terminal 102, the address book information management unit 706 manages the address book information 830 received from the image forming apparatus 101.

Next, in step S1010, the destination information control unit 704 of the PC terminal 102 acquires necessary information (the file name and the address book information 830) from the file information management unit 703 and the address book information management unit 706 and performs collation processing. The following describes a detailed processing flow of the collation processing with reference to a flowchart 1100 of the collation processing illustrated in FIG. 11.

Figure 11:
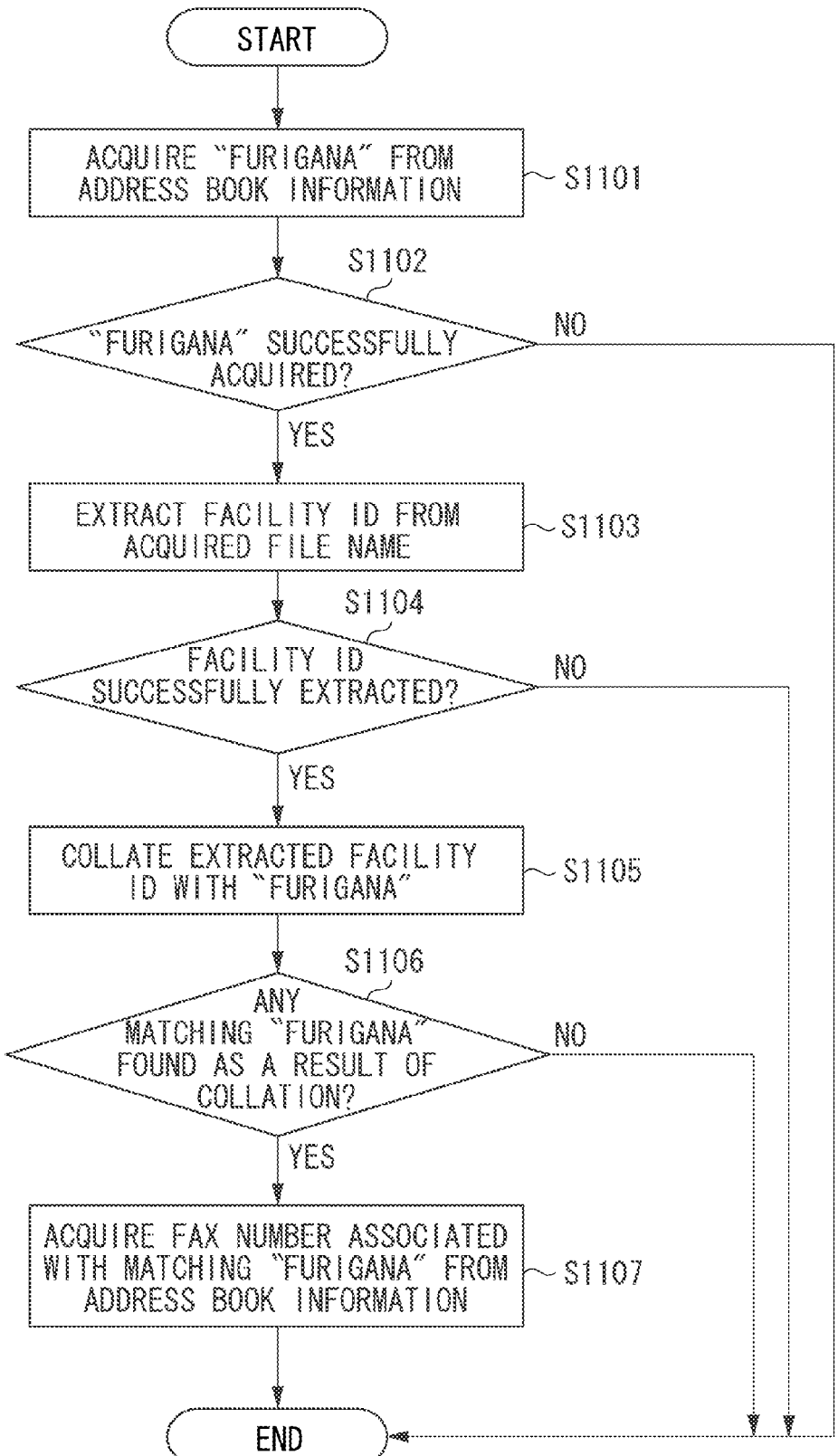
FIG. 11 is a flowchart illustrating details of collation processing according to an exemplary embodiment of the present invention.

FIG. 11 is a flowchart illustrating operations performed in the collation processing by the PC terminal 102 using the file name of the file acquired from the cloud service server 131 in step S1006 and the address book information 830 acquired from the image forming apparatus 101 in step S1009. The CPU 411 of the PC terminal 102 executes a control program stored in the HDD 414 to implement each operation (step) specified in the flowchart illustrated in FIG. 11.

In step S1101, the PC terminal 102 acquires the furigana 833 from the address book information 830. In step S1102, the PC terminal 102 determines whether the furigana 833 has successfully been acquired. If the PC terminal 102 determines that the furigana 833 has not been successfully acquired (NO in step S1102), the processing is ended. On the other hand, if the PC terminal 102 determines that the furigana 833 has successfully been acquired from the address book information 830 (YES in step S1102), the processing proceeds to step S1103, and the PC terminal 102 extracts the facility ID (the item 817) of the transmission destination from the file name of the file acquired in step S1006. The facility ID is extracted by extracting a character string (digit string) described at a predetermined position based on the file name format. Next, in step 1104, the PC terminal 102 determines whether the facility ID (the item 817) has successfully been extracted from the file name. If the PC terminal 102 determines that the facility ID (the item 817) has not been successfully extracted (NO in step S1104), the processing is ended. On the other hand, if the PC terminal 102 determines that the facility ID (the item 817) has been successfully extracted (YES in step S1104), the processing proceeds to step S1105, and the PC terminal 102 collates the extracted facility ID (the item 817) with the furigana 833 acquired in step S1101. The collation logic is as follows. The facility ID (the item 817) is collated with the furigana 833, and if the facility ID (the item 817) and the furigana 833 match each other (i.e., if there is furigana containing the extracted facility ID), the collation processing is ended immediately, and the processing proceeds to step S1106. In step S1106, whether any furigana matching the extracted facility ID is found as a result of the collation is determined. If it is determined that there is no furigana matching the extracted facility ID (NO in step S1106), the processing is ended. On the other hand, if it is determined that there is furigana matching the extracted facility ID (YES in step S1106), the processing proceeds to step S1107, and the fax number 834 associated with the matching furigana is acquired from the address book information 830. In this way, the fax number 834 of the transmission destination can be determined by collating the file name of the acquired file with the address book information 830.

Back to the description of FIG. 10, in step S1010, the destination information control unit 704 performs the collation processing as described above to acquire the fax number 834 to be used as the transmission destination of the file downloaded in step S1006. In step S1011, the fax request generation unit 705 transmits a fax transmission request to the image forming apparatus 101 using the fax number 834 of the transmission destination acquired in step S1010 and the file downloaded in step S1006. In the image forming apparatus 101, when the request reception unit 501 receives the fax transmission request, in step S1012, the fax transmission unit 504 transmits a fax to the fax number of the transmission destination (fax terminal 104). When the image forming apparatus 101 completes the fax transmission, in step 1013, the image forming apparatus 101 returns to the PC terminal 102 a response indicating the completion of the fax transmission.

In step S1010 described above, the destination information control unit 704 may display a fax transmission dialog in which the fax number acquired by the collation processing is set as the transmission destination, allowing the user to check the destination and correct it as needed. With this configuration, if the user checks the destination on the fax transmission dialog and presses the OK button (send button), the processing proceeds to step S1011, and a fax transmission request is transmitted. As the foregoing describes, in the present exemplary embodiment, the collation processing illustrated in FIG. 11 is executed to search for the fax number of the destination associated with the facility ID included in the file name of the file to be transmitted by fax, among the address book information 830 acquired from the image forming apparatus 101. As described above, in the first exemplary embodiment, the system is configured to provide the function of uniquely determining the fax transmission destination based on the ID included in the file name that is automatically given on the server, whereby an erroneous fax transmission can be prevented.

The following describes a second exemplary embodiment of the present invention. In the first exemplary embodiment, the method in which the facility ID is extracted from the predetermined position in the file name has been described in step S1103 of the flowchart 1100 of the collation processing. The second exemplary embodiment provides a configuration for a case where formats of file names of files that are respectively generated by a plurality of service servers are different. The present exemplary embodiment will describe a method of using a file naming rule file 820 illustrated in FIG. 8B to extract a facility ID from each of file names generated in different formats. Other configurations are similar to those described in the first exemplary embodiment, and the description thereof is thus omitted.

FIG. 8B illustrates an example of a file name naming rule file describing two types of file name naming rules. One of the naming rules is described in "*_*_*_*(*)_*(target)_*.pdf" format, and the other is described in "*_target_*_*_*_*.pdf" format. The following describes each element separated by an underscore or parentheses in a file name. An asterisk (*) 821 is a character indicating that an arbitrary character string can be specified. A target 822 is a character string indicating a position in which the facility ID is to be specified. Further, "1" or "0" of an element 823 described at the end of each file name naming rule is a value indicating a naming rule ON/OFF switch. The value "1" indicates that the naming rule is enabled (ON), whereas the value "0" indicates that the naming rule is disabled (OFF) (although the naming rule is defined).

Figure 12:
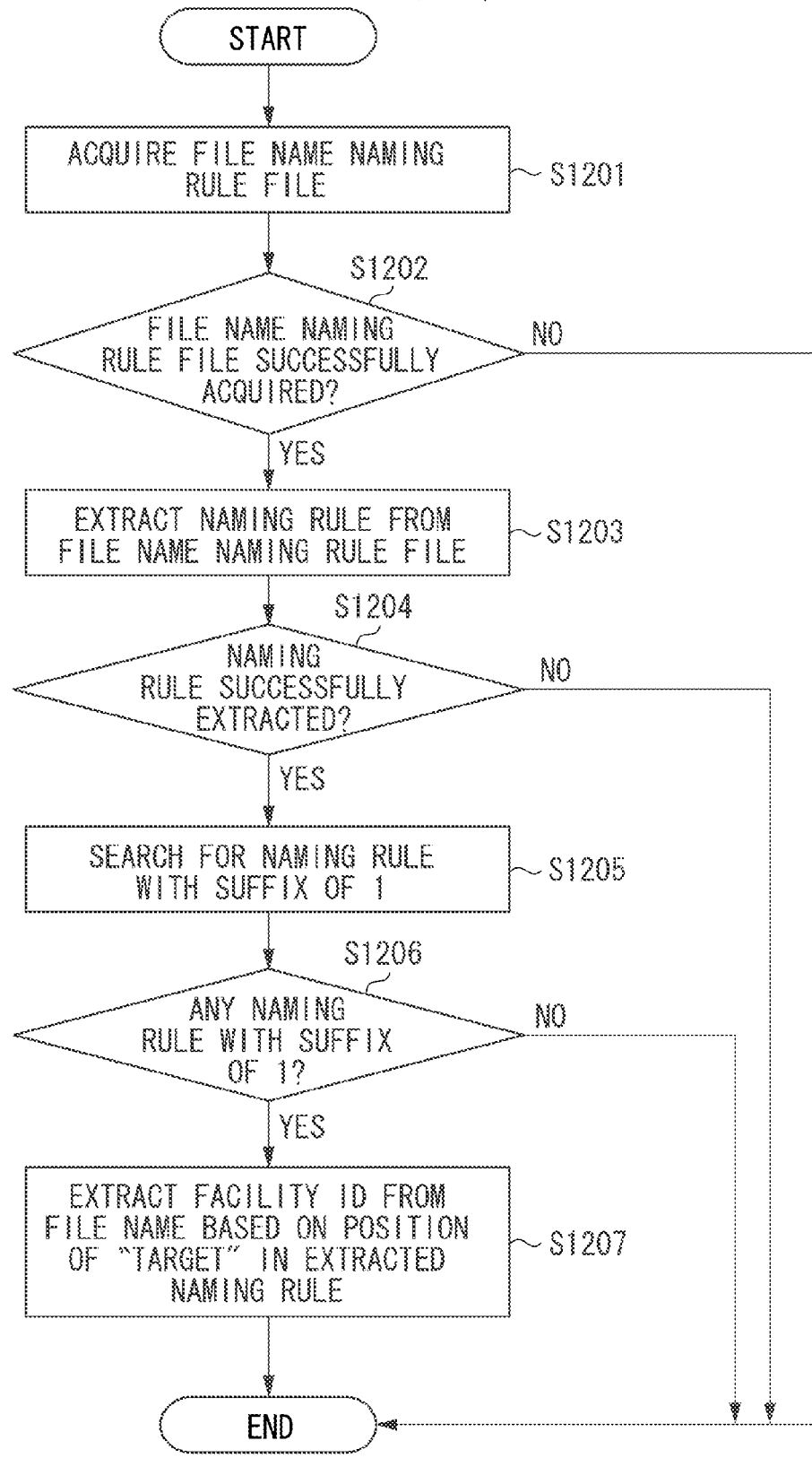
FIG. 12 is a flowchart illustrating extraction of an identifier (ID) of a transmission destination by using the file name naming rule according to a second exemplary embodiment.

FIG. 12 is a flowchart illustrating a facility ID extraction step using the file name naming rule 820. The CPU 411 of the PC terminal 102 executes a control program stored in the HDD 414 to implement each operation (step) specified in the flowchart illustrated in FIG. 12.

In step S1201, the destination information control unit 704 acquires the file name naming rule file 820 from a local folder. While the present exemplary embodiment describes the file name naming rule file 820 assuming that it exists in the local folder as a software module setting file, the file name naming rule file 820 may exist in any other apparatus on the network. In step S1202, the destination information control unit 704 determines whether the file name naming rule file 820 has been successfully acquired. If the file name naming rule file 820 has not been successfully acquired (NO in step S1202), the processing is ended. On the other hand, if the file name naming rule file 820 has been successfully acquired (YES in step S1202), then in step S1203, the destination information control unit 704 extracts a naming rule from the file name naming rule file 820. In step S1204, the destination information control unit 704 determines whether the naming rule has been successfully acquired. If the naming rule has not been successfully acquired (NO in step S1204), the processing is ended. On the other hand, if the naming rule has been successfully acquired (YES in step S1204), then in step S1205, the destination information control unit 704 searches for a record (rule) with a suffix of "1" among the acquired naming rules. A record with a suffix of "1" indicates that the naming rule is enabled as described above. In step 1206, the destination information control unit 704 determines whether there is any naming rule with a suffix of "1". If there is no naming rule with a suffix of "1" (NO in step S1206), the processing is ended. On the other hand, if there is a naming rule with a suffix of "1" (YES in step S1206), the processing proceeds to step S1207, and the destination information control unit 704 extracts the facility ID from the file name based on the position of "target" in the extracted naming rule. The following is a specific example. In a case where the facility ID is extracted from the file name using the file name naming rule 820, it is determined that the naming rule of the first record of the file name naming rule 820 is enabled, and "2345678901" corresponding to the character string "target" is extracted as the facility ID.

Using the file name naming rule file as described above makes it possible to define a plurality of naming rules so that the case where a plurality of cloud service servers that outputs different types of file names can be handled.

While an asterisk is used to allow an arbitrary character string in the file name naming rule illustrated in FIG. 8B described above, this is not a limiting case, and the naming rule may be specified in more detail using a regular expression. An example of the regular expression is illustrated in FIG. 8D. While FIG. 8D illustrates a description example of a regular expression using the .NET Framework, any regular expression description method may be used. FIG. 8D illustrates an example of the regular expression corresponding to the file name format 810 illustrated in FIG. 8A. The date is described in the element 811, and accordingly <date> 841 is specified in the regular expression. The element 812 indicates the type of form, and accordingly <formtype> 842 is specified in the regular expression. The element 813 indicates the name of the transmission source facility, and accordingly <srcname> 843 is specified in the regular expression. Further, the element 844 indicates the type of the transmission source facility, and accordingly <srctype> 844 is specified in the regular expression. Further, the element 815 indicates the ID of the transmission source facility, and accordingly <srcID> 845 is specified in the regular expression. The element 816 indicates the name of the transmission destination facility, and accordingly <dstname> 816 is specified in the regular expression. The element 817 indicates the ID of the transmission destination facility, and accordingly <dstID> 847 is specified in the regular expression. The element 818 indicates the year, month, and data on which the file was generated, and accordingly <datetime> 848 is specified in the regular expression.

Figure 13:
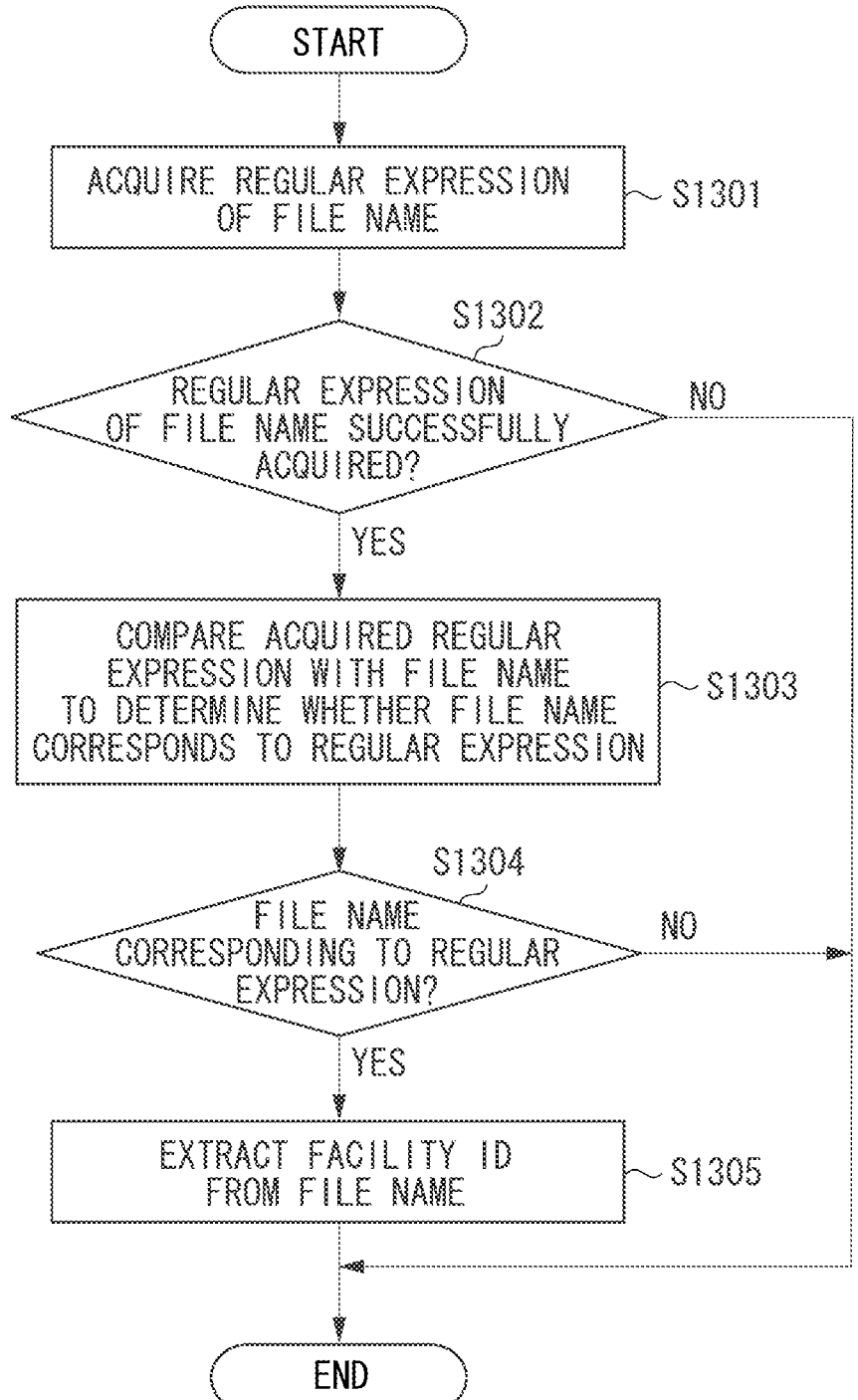
FIG. 13 is a flowchart illustrating extraction of an ID of a transmission destination by using the file name naming rule using the regular expression.

Since the facility ID of the transmission destination facility is described in the element 817, the ID of the transmission destination can be extracted by specifying the <dstID> 847 as "target". In a case where the facility ID of the transmission destination facility is acquired by an expression method using the regular expression, when a file with a file name that is in a non-designated format is acquired, erroneous processing of the file is prevented. FIG. 13 illustrates a flow in which when a file with a file name in a non-designated format is received, the file is determined as a non-processing target.

In step S1301, the destination information control unit 704 acquires the regular expression of the file name. This information may be described in a file on the local folder or the network folder or may be information managed in the destination information control unit 704. In step S1302, the destination information control unit 704 determines whether the file name regular expression has been successfully acquired. If the file name regular expression has not been successfully acquired (NO in step S1302), the processing is ended. On the other hand, if the file name regular expression has been successfully acquired (YES in step S1302), then in step S1303, the destination information control unit 704 compares the acquired file name regular expression with the file name to determine whether the file name corresponds to the description of the regular expression. In step S1304, the destination information control unit 704 determines whether the file name corresponds to the regular expression, based on the comparison result. If the file name does not correspond to the description of the regular expression (NO in step S1304), the processing is ended. On the other hand, if the file name corresponds to the description of the regular expression (YES in step S1304), then in step S1305, the destination information control unit 704 extracts the facility ID from the file name based on the regular expression in a predetermined position. The foregoing configuration enables accurate determination about whether a file name in a non-designated format is received, whereby the possibility of erroneous determination of a file in a non-designated format as a processing target can be decreased.

The following describes a third exemplary embodiment. The first and second exemplary embodiments have described the methods in which a facility ID (unique identifier for identifying a transmission destination) is extracted from a file name to identify the fax number of the transmission destination. The third exemplary embodiment will describe a collation unit using a facility name of a transmission destination. Using a facility name makes it possible to handle a case where no facility ID is registered in the address book information 830 of the image forming apparatus 101. More specifically, as described below, the collation processing can be performed even when no facility ID is registered in the furigana 833 of the address book information 830 illustrated in FIG. 8C. A description similar to that in the first or second exemplary embodiment is omitted.

Figure 14:
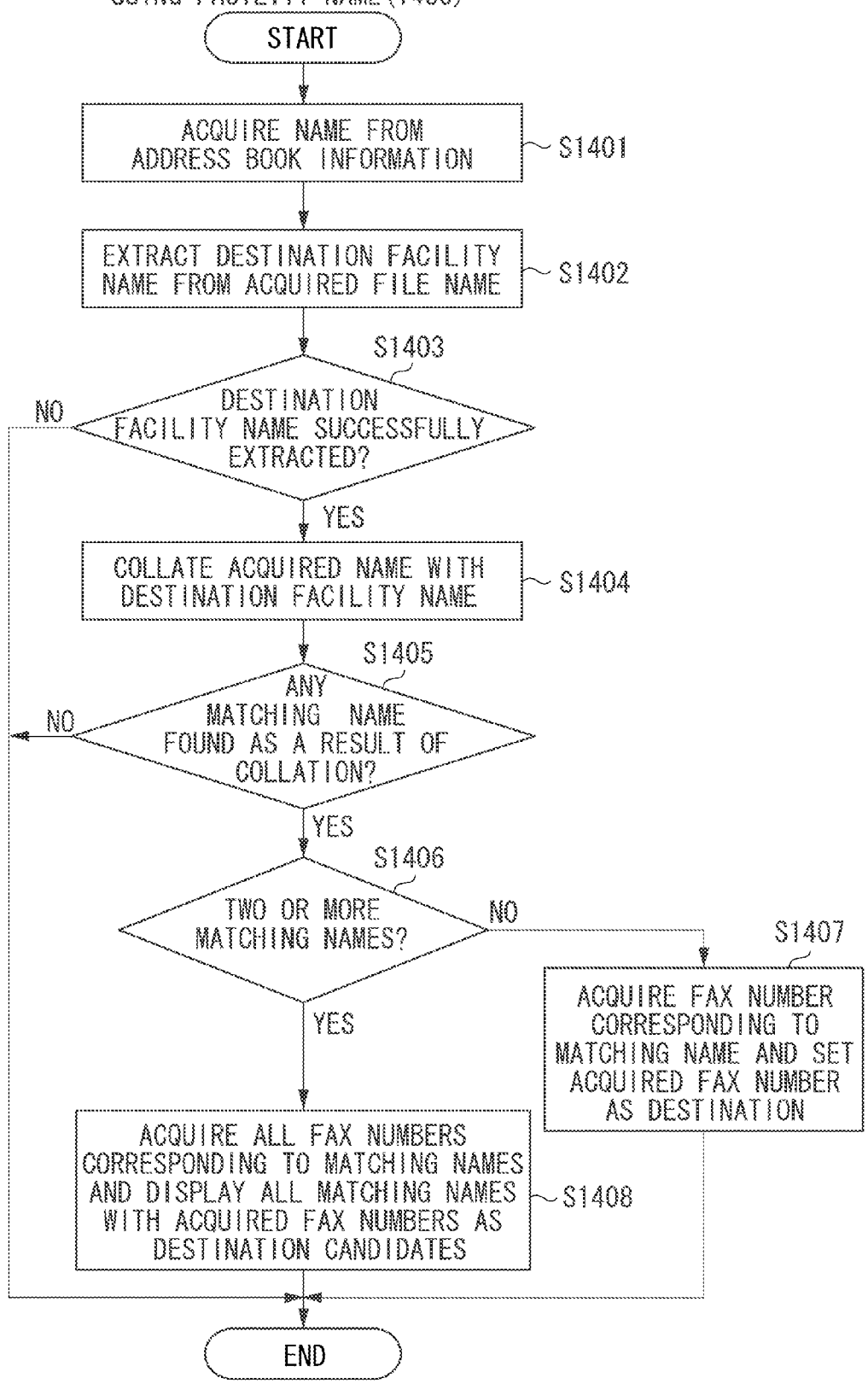
FIG. 14 is a flowchart illustrating collation processing using a facility name.

FIG. 14 is a flowchart illustrating operations in the collation processing performed by the PC terminal 102 using the file acquired by the cloud service server 131 in step S1006 and the address book information 830 acquired from the image forming apparatus 101 in step S1009. The CPU 411 of the PC terminal 102 executes a control program stored in the HDD 414 to implement each operation (step) specified in the flowchart illustrated in FIG. 14.

In step S1401, the destination information control unit 704 acquires the name 832 from the address book information 830. In step S1402, the destination information control unit 704 extracts the transmission destination facility name (the item 816) from the file name of the file acquired in step S1006. In step S1403, the destination information control unit 704 determines whether the transmission destination facility name (the item 816) has been successfully extracted. If the transmission destination facility name (the item 816) has not been successfully extracted (NO in step S1403), the processing is ended. On the other hand, if the transmission destination facility name 816 has been successfully extracted (YES in step S1403), the processing proceeds to step S1404, and the destination information control unit 704 collates the name 832 acquired in step S1401 with the transmission destination facility name (the item 816) extracted in step S1402. The collation logic is as follows. The transmission destination facility name (the item 816) is collated with the name 832, and all the names 832 that (partially or completely) match the transmission destination facility name (the item 816) are acquired as transmission destination candidates. In the first and second exemplary embodiments, since the facility ID that is a unique number is used, there is no case where a plurality of transmission destinations matches the transmission destination facility name (the item 816). In the third exemplary embodiment, however, a plurality of different transmission destinations including similar facility names may be registered in the address book information 830. Thus, all the matching names are listed as transmission destination candidates. While the transmission destination facility name (the item 816) is used as a collation target in the third exemplary embodiment, character information of any other item included in the address book information 830 may be used as a collation target.

In step S1405, the destination information control unit 704 determines whether any name matching the transmission destination facility name (the item 816) is found as a result of the collation in step S1404. If there is no name matching the transmission destination facility name (the item 816) (NO in step S1405), the processing is ended. In a case where there is no name matching the transmission destination facility name (the item 816), instead of ending the processing, all pieces of address book information 830 acquired in step S1009 may be listed to cause the fax request generation unit 705 to prompt the user to specify a transmission destination.

On the other hand, in step S1405, if there is any name matching the transmission destination facility name (the item 816) (YES in step S1405), the processing proceeds to step S1406, and the destination information control unit 704 determines whether there are two or more names matching the transmission destination facility name (the item 816) in the address book information 830. If there is only one matching name, the processing proceeds to step S1407, and the destination information control unit 704 acquires from the address book information 830 the fax number 834 corresponding to the matching name. Then, the destination information control unit 704 displays a fax transmission dialog in which the acquired single fax number is set as the transmission destination to prompt the user to check the destination.

On the other hand, in step S1406, if there are two or more names matching the transmission destination facility name (the item 816), the processing proceeds to step S1408, and the destination information control unit 704 acquires from the address book information 830 all the fax numbers corresponding to the respective matching names and displays a list of all the matching names as transmission destination candidates. Then, the destination information control unit 704 displays a fax transmission dialog in which a list of all the acquired fax numbers is displayed as transmission destination candidates in a candidate field. The fax request generation unit 705 prompts the user to specify a desired transmission destination from the displayed list of fax numbers to identify the fax number 834.

FIG. 15 illustrates an example of a UI (fax transmission dialog 1500) for selecting a transmission destination address. An address list box 1502 is an area for displaying in step S1408 a list of fax numbers of a plurality of names that matches the transmission destination facility name (the item 816) as transmission destination candidates in a case where a plurality of names matches the transmission destination facility name (the item 816) in the collation in step S1406. The address list box 1502 may also be used to display a list of the address book information 830 acquired in step S1009 in a case where no name matches the transmission destination facility name (the item 816) in step S1405.

A search keyword specification text box 1501 is provided so that the user can input a character string in the search keyword specification text box 1501, and search and filter a list of the address book information 830 displayed in the address list box 1502 using the input character string. When the user selects a desired address from the transmission destination candidates displayed in the address list box 1502 and presses an add button 1503, the selected address is added to a transmission destination address 1504. The transmission destination address 1504 is a list box for displaying a list of addresses that can be fax transmission destinations. If the OK button 1509 is pressed by the user in a state where an address is set in the transmission destination address 1504, a fax transmission request is transmitted to transmit a fax to the destination(s) listed in the destination address 1504. A cancel button 1510 is used to cancel a fax transmission.

An add new address button 1505 is used to add, as a transmission destination, an address that is not displayed in the address list 1502. An edit button 1506 is used to edit the transmission destination(s) listed in the destination address 1504 (e.g., correct a fax number). A delete button 1507 is used to delete, from the transmission destination address 1504, a transmission destination selected by the user from the destination(s) listed in the transmission destination address 1504. A cover sheet button 1508 is used to set a cover sheet for fax transmission.

According to the third exemplary embodiment, a character string of a predetermined portion (a character string in an arbitrary position in a file name) is extracted from a file name of a file to be transmitted, and the extracted character string is collated with the address book information to acquire a transmission destination candidate. This enables a transmission destination to be easily specified. Further, when only one destination matches the extracted character string as a result of collation, the destination is set as the transmission destination so that the transmission processing can be performed immediately. Further, since a destination is identified based on a file name of a file generated by an external service server (external apparatus), the user does not have to manually input a destination and, furthermore, erroneous inputs of destinations by the user can be decreased.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-126676, filed Jun. 19, 2014, which is hereby incorporated by reference herein in its entirety.

What is claimed is:

1. An information processing apparatus comprising:
 a memory; and
 a processor in communication with the memory, the processor configured to control:
 a first acquisition unit configured to acquire a file from a file generation apparatus;
 a second acquisition unit configured to acquire address book information including a facsimile number from an apparatus having a facsimile function;
 an extraction unit configured to extract a character string from a filename of the file acquired by the first acquisition unit; and
 a collation unit configured to collate the character string extracted by the extraction unit with the address book information acquired by the second acquisition unit to identify a facsimile number of a transmission destination of the acquired file, wherein the extraction unit uses a naming rule file containing a plurality of different naming rules where each naming rule is specified as enabled or disabled for identifying a predetermined position to extract the character string from the filename.

2. The information processing apparatus according to claim 1, wherein the extraction unit extracts a unique identifier (ID) for identifying the transmission destination as the character string from a predetermined position of the filename.

3. The information processing apparatus according to claim 1, wherein the extraction unit extracts a name of the transmission destination as the character string from a predetermined position of the filename.

4. The information processing apparatus according to claim 1, wherein the naming rule file is defined using a regular expression, and wherein the extraction unit determines whether the filename of the file acquired by the first acquisition unit corresponds to the regular expression, and the extraction unit extracts the character string from the predetermined position in the filename in a case where the extraction unit determines that the filename corresponds to the regular expression, and the extraction unit does not extract the character string in a case where the extraction unit determines that the filename does not correspond to the regular expression.

5. The information processing apparatus according to claim 1, wherein in a case where as a result of the collation of the character string extracted by the extraction unit with the address book information acquired by the second acquisition unit, a plurality of destinations matches the character string, the collation unit displays a list of the plurality of matching destinations as transmission destination candidates.

6. The information processing apparatus according to claim 1, wherein in a case where as a result of the collation of the character string extracted by the extraction unit with the address book information acquired by the second acquisition unit, a single destination matches the character string, the collation unit displays a transmission dialog in which the matching single destination is set as the transmission destination.

7. The information processing apparatus according to claim 1, further comprising a transmission unit configured to transmit a facsimile transmission request to the apparatus having the facsimile function by using the facsimile number of the transmission destination that is identified by the collation unit and the file acquired by the first acquisition unit.

8. The information processing apparatus according to claim 1, wherein the file generation apparatus is a virtual server using cloud computing.

9. A non-transitory computer-readable storage medium storing a program for controlling a computer to function as:
a first acquisition unit configured to acquire a file from a file generation apparatus;
a second acquisition unit configured to acquire address book information including a facsimile number from an apparatus having a facsimile function;
an extraction unit configured to extract a character string from a filename of the file acquired by the first acquisition unit; and
a collation unit configured to collate the character string extracted by the extraction unit with the address book information acquired by the second acquisition unit to identify a facsimile number of a transmission destination of the acquired file,
wherein the extraction unit uses a naming rule file containing a plurality of different naming rules where each naming rule is specified as enabled or disabled for identifying a predetermined position to extract the character string from the filename.

10. A method executed by a processor of an information processing apparatus, the method comprising:
acquiring a file from a file generation apparatus;
acquiring address book information including a facsimile number from an apparatus having a facsimile function;
extracting a character string from a filename of the acquired file; and
collating the extracted character string with the acquired address book information to identify a facsimile number of a transmission destination of the acquired file,
wherein the extraction uses a naming rule file containing a plurality of different naming rules where each naming rule is specified as enabled or disabled for identifying a predetermined position to extract the character string from the filename.

* * * * *